(12) United States Patent
Harris et al.

(10) Patent No.: US 12,184,715 B2
(45) Date of Patent: Dec. 31, 2024

(54) RECONSTRUCTION OF CBR TRANSPORT STREAMS

(71) Applicant: MK Systems USA Inc., Wilmington, DE (US)

(72) Inventors: Rhodri Harris, Southampton (GB); David Clewer, Southampton (GB); Jonathan Page, Southampton (GB)

(73) Assignee: MK Systems USA Inc., Wilmington, DE (US)

( * ) Notice: Subject to any disclaimer, the term of this patent is extended or adjusted under 35 U.S.C. 154(b) by 0 days.

(21) Appl. No.: 17/871,055

(22) Filed: Jul. 22, 2022

(65) Prior Publication Data

US 2024/0031419 A1    Jan. 25, 2024

(51) Int. Cl.
*H04L 65/75* (2022.01)
*H04L 65/61* (2022.01)
*H04L 65/70* (2022.01)

(52) U.S. Cl.
CPC ............ *H04L 65/764* (2022.05); *H04L 65/61* (2022.05); *H04L 65/70* (2022.05)

(58) Field of Classification Search
CPC ........ H04L 65/764; H04L 65/61; H04L 65/70
See application file for complete search history.

(56) References Cited

U.S. PATENT DOCUMENTS

| | | | | |
|---|---|---|---|---|
| 5,025,457 A | * | 6/1991 | Ahmed | H04J 3/0632 375/354 |
| 5,896,388 A | * | 4/1999 | Earnest | H04L 65/80 370/230.1 |

(Continued)

FOREIGN PATENT DOCUMENTS

EP    2311260 B1    12/2014

OTHER PUBLICATIONS

"ST 2022-4:2011—SMPTE Standard—Unidirectional Transport of Non-Piecewise Constant Variable Bit Rate MPEG-2 Streams on IP Networks," in ST 2022-4:2011 , vol. No., pp. 1-9, Jun. 8, 2011, doi: 10.5594/SMPTE.ST2022-4.2011.

(Continued)

*Primary Examiner* — Suraj M Joshi
*Assistant Examiner* — Jaren Means
(74) *Attorney, Agent, or Firm* — Norton Rose Fulbright US LLP

(57) ABSTRACT

Systems, methods, and devices for generating a constant bitrate (CBR) transport stream in manners that facilitate subsequent reconstruction, and for performing such reconstruction are disclosed herein. For example, generating a CBR transport stream may include for each payload packets: sampling a clock source to obtain a clock sample; and inserting an encoding of the clock sample in a stuffing area of a header of the payload packet. For example, reconstructing a CBR transport stream may include receiving a plurality of packets of a variable bitrate (VBR) transport stream; for a pair of adjacent packets in the VBR transport stream: extracting a clock sample from a header of each of the pair adjacent packets; computing a delta between the clock samples; and inserting one or more null packets between the adjacent packets based on the computed delta and a timing metric corresponding to a bitrate of the CBR transport stream.

19 Claims, 10 Drawing Sheets

(56) References Cited

U.S. PATENT DOCUMENTS

| | | | |
|---|---|---|---|
| 7,349,386 B1* | 3/2008 | Gou | H04L 65/1101 |
| | | | 370/466 |
| 11,323,758 B1* | 5/2022 | Hegar | H04N 21/23608 |
| 2008/0025345 A1* | 1/2008 | Park | H04N 21/4305 |
| | | | 375/E7.278 |
| 2010/0189122 A1* | 7/2010 | Dandekar | H04L 65/762 |
| | | | 370/412 |
| 2017/0180767 A1* | 6/2017 | Oh | H04N 21/23614 |
| 2019/0200055 A1* | 6/2019 | Ebata | H04N 21/4343 |

OTHER PUBLICATIONS

ETSI TS 101 191 V1.4.1 (Jun. 2004), Technical Specification, "Digital Video Broadcasting (DVB); DVB mega-frame for Single Frequency Network (SFN) synchronization," 18 pages.

Patent Cooperation Treaty, Communication, Extended Search Report issued for European Patent Application No. 23186650.0, dated Dec. 8, 2023, 9 pages.

\* cited by examiner

RECONSTRUCTION OF CBR TRANSPORT STREAMS

TECHNICAL FIELD

This disclosure relates to transport streams, and more particularly relates to reconstructing constant bitrate transport streams.

BACKGROUND OF THE INVENTION

Streaming of video content to end users over the Internet, such as via over-the-top media services, often utilizes transport streams such as MPEG transport streams. Such transport streams often do not exhibit linear timing characteristics. For example, non-linearity may be introduced when a constant bitrate (CBR) transport stream is changed to a variable bitrate (VBR) transport stream. Processing of such transport streams by a downstream system that requires linearity may be hindered. Accordingly, improvements in processing of such transport streams is desired.

BRIEF SUMMARY OF THE INVENTION

In accordance with an aspect, there is provided a computer-implemented method for reconstructing a constant bitrate (CBR) transport stream. The method includes receiving a plurality of packets of a variable bitrate (VBR) transport stream; for a pair of adjacent packets in the VBR transport stream: extracting a clock sample from a header of each of the pair adjacent packets; computing a delta between the clock samples; and inserting one or more null packets between the adjacent packets based on the computed delta and a timing metric corresponding to a bitrate of the CBR transport stream.

A count of the inserted one or more null packets may be based on computing a multiple of the delta relative to the timing metric.

The clock sample may be extracted from a stuffing area of the header.

The stuffing area may be located in an adaption field of the header.

The extracting the clock sample may include decoding the clock sample from a type-length-value construct.

The method may further include detecting a byte sequence in the header indicating that the clock sample is present.

The method may further include estimating the timing metric from a subset of the plurality of packets.

The estimating may include determining a minimum delta between adjacent pairs of packets in the subset of the plurality of packets.

The method may further include reordering packets based on the clock samples.

In accordance with another aspect, there is provided a computer-implemented system for reconstructing a constant bitrate (CBR) transport stream. The system includes at least one processor; memory in communication with the at least one processor; and software code stored in the memory. The software code when executed at the at least one processor causes the system to: for a pair of adjacent packets in the VBR transport stream: extract a clock sample from a header of each of the adjacent packets; compute a delta between the clock samples; and insert one or more null packets between the adjacent packets based on the computed delta and a timing metric corresponding to a bitrate of the CBR transport stream.

A count of the inserted one or more null packets may be based on computing a multiple of the delta relative to the timing metric.

The clock sample may be extracted from a stuffing area of the header.

The stuffing area may be located in an adaptation field of the header.

In accordance with yet another aspect, there is provided a computer-implemented method for generating a constant bitrate (CBR) transport stream. The method includes for each of a plurality of payload packets: sampling a clock source to obtain a clock sample; and inserting an encoding of the clock sample in a stuffing area of a header of the payload packet; and providing the CBR transport stream including the plurality of payload packets.

The clock sample may be encoded using a type-length-value construct.

The clock source may be a system clock.

The clock sample may be a subset of a sample of the system clock.

The stuffing area may be located in an adaptation field of the header.

The method may further include setting a bit of the adaption field control field of the header.

In accordance with a further aspect, there is provided a constant bitrate (CBR) transport stream source comprising: a clock; and a packet processor that, for each of a plurality of payload packets, samples a clock source to obtain a clock sample from the clock and inserts the clock sample into the stuffing area of a header of the payload packet; and a transmitter that transmits a CBR transport stream including the payload packets.

The stuffing area may be located in an adaptation field of the header.

Many further features and combinations thereof concerning embodiments described herein will appear to those skilled in the art following a reading of the instant disclosure.

BRIEF DESCRIPTION OF THE DRAWINGS

In the figures.

These drawings depict exemplary embodiments for illustrative purposes, and variations, alternative configurations, alternative components and modifications may be made to these exemplary embodiments.

DETAILED DESCRIPTION OF THE INVENTION

Moreover, the scope of the present application is not intended to be limited to the particular embodiments of the process, machine, manufacture, composition of matter, means, methods and steps described in the specification.

Figure 1:
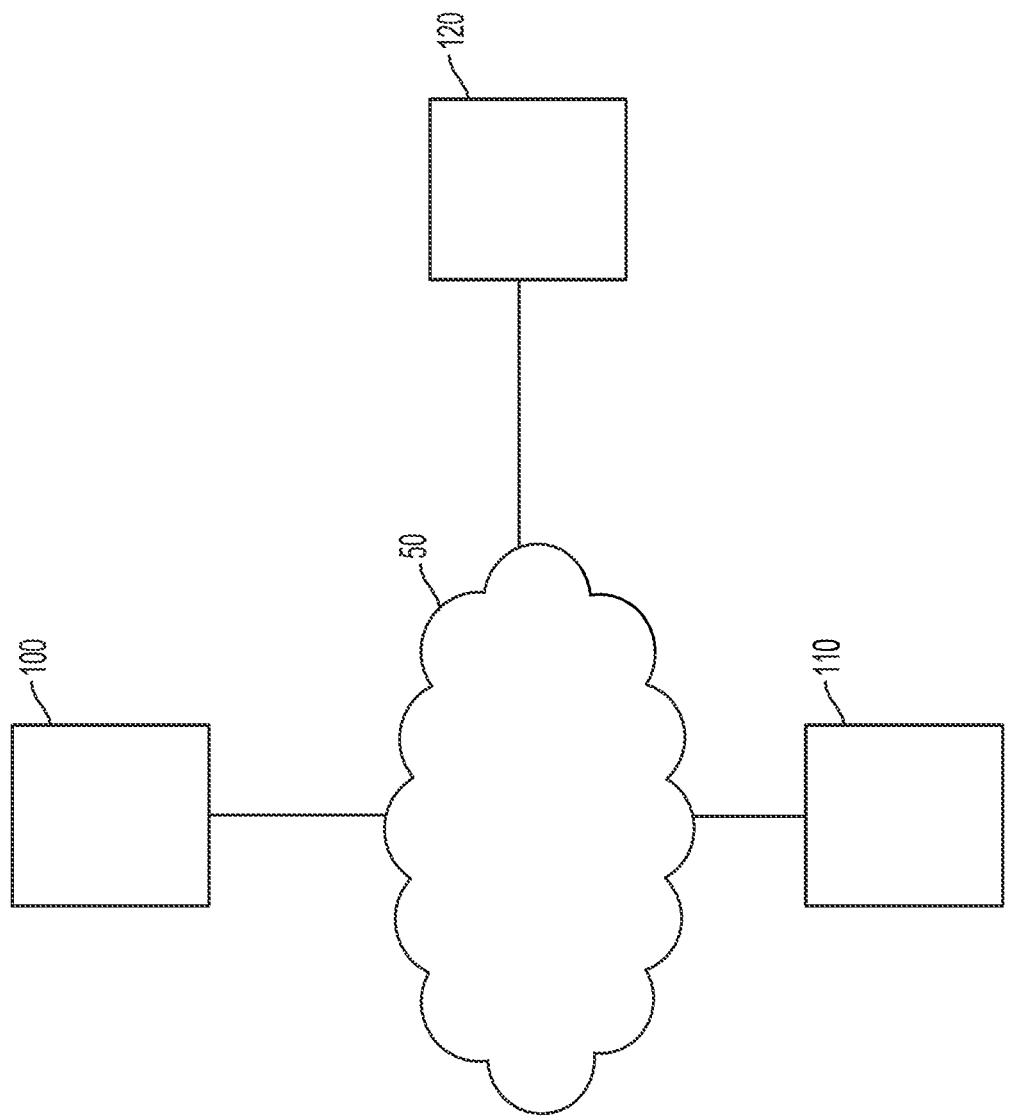
FIG. 1 is a is a network diagram of a network environment of a transport stream (TS) generation system, a TS alteration system, and a TS reconstruction system, in accordance with an embodiment.

FIG. 1 is a diagram depicting a network environment of computer-implemented systems for processing transport streams in manners disclosed herein. These systems may cooperate, for example, to generate a CBR transport stream in manners that facilitate subsequent reconstruction, and also to perform such reconstruction.

Reconstruction of a CBR transport stream may be desired, for example, when the transport stream is altered, e.g., when packets in a CBR transport stream are removed, lost, or become out of order, or when timing of the transport stream is altered such that its bitrate is no longer constant.

As depicted, the network environment includes a transport stream (TS) generation system 100, a TS alteration system 110, and a TS reconstruction system 120, interconnected by a network 50.

Figure 2:
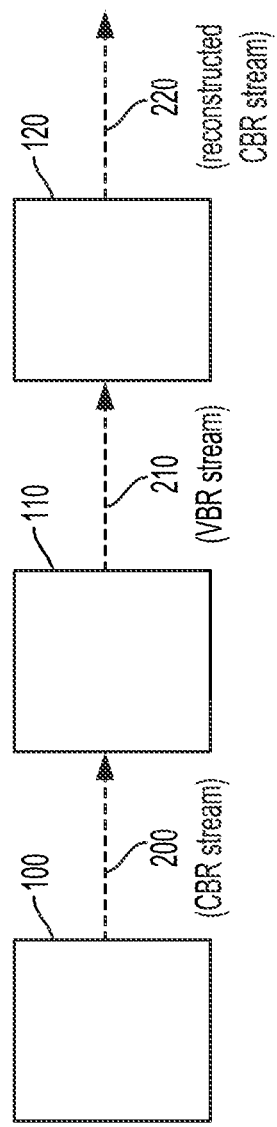
FIG. 2 is a high-level schematic diagram of example processing and transmission of transport streams, in accordance with an embodiment.

FIG. 2 is a high-level schematic diagram of example processing and transmission of transport streams at TS generation system 100, TS alteration system 110, and TS reconstruction system 120.

As depicted, TS generation system 100 generates a CBR transport stream 200 and transmits it to TS alteration system 110. TS alteration system 110 processes CBR transport stream 200 and generates a VBR transport stream 210. In one example, VBR transport stream 210 may be generated from CBR transport stream 200 by removing one or more null packets therefrom. TS alteration system 110 transmits VBR transport stream 210 to TS reconstruction system 120. TS reconstruction system 120 processes VBR transport stream 210 to generate a CBR transport stream 220. In some embodiments, CBR transport stream 220 may have packets and/or packet timing characteristics substantially similar to CBR transport stream 200. Given this similarity, the processing performed at TS reconstruction system 120 may be regarded as reconstructing a CBR transport stream, and CBR transport stream 220 may be regarded as a reconstructed transport stream. Optionally, TS reconstruction system 120 may transmit CBR transport stream 220 to another system (not shown), e.g., for downstream decoding, storage, or the like.

In the depicted embodiment, transport streams 200, 210, and 220 are each MPEG transport streams. However, in other embodiments, one or more of transport streams 200, 210, and 220 may be another type of transport stream suitable for one or more of audio data, video data, and control data. For example, one or more of transport streams 200, 210, and 220 may implement another data container format.

In the depicted embodiments, transport streams 200, 210, and 220 substantially adhere to ISO/IEC standard 13818-1 (or ITU-T Rec. H.222.0). However, in other embodiments, one or more of transport streams 200, 210, and 220 may adhere to one or more other standards.

The transmission of transport streams 200, 210, and 220 depicted in FIG. 2 may be by way of network 50.

Network 50 may include a packet-switched network portion, a circuit-switched network portion, or a combination thereof. Network 50 may include wired links, wireless links such as radio-frequency links or satellite links, or a combination thereof. Network 50 may include wired access points and wireless access points. Portions of network 50 could be, for example, an IPv4, IPv6, X.25, IPX or similar network. Portions of network 50 could be, for example, a GSM, GPRS, 3G, LTE or similar wireless networks. Network 50 may include or be connected to the Internet. When network 50 is a public network such as the public Internet, it may be secured as a virtual private network.

In the depicted embodiment, portions of network 50 may be adapted for transmission of transport streams over HTTP. In other embodiments, other protocols may be used for transmission of transport streams.

Figure 3:
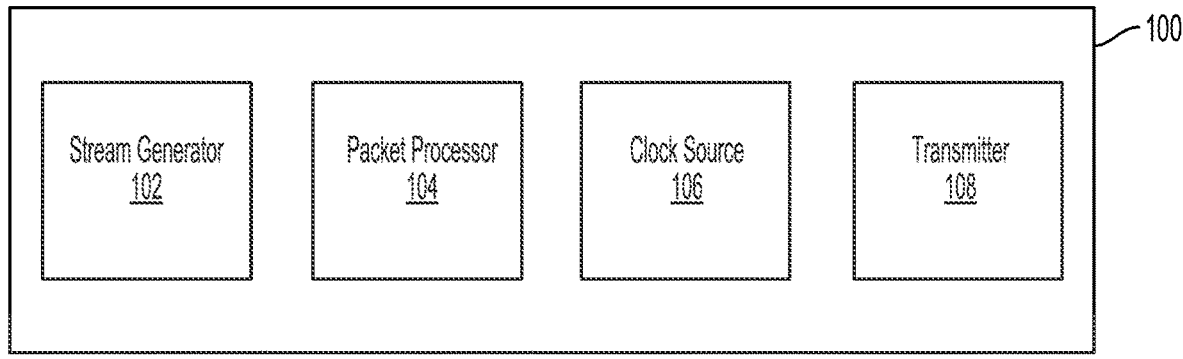
FIG. 3 is a FIG. 3 is a schematic diagram of the TS generation system of FIG. 1, in accordance with an embodiment.

FIG. 3 is a high-level schematic diagram of TS generation system 100, in accordance with an embodiment. TS generation system 100 is a CBR transport stream source. TS generation system 100 is configured to generate a CBR transport stream with packets that are enhanced with timing data to facilitate subsequent reconstruction. As depicted, TS generation system 100 includes a stream generator 102, a packet processor 104, a clock source 106, and a transmitter 108.

Stream generator 102 is a configured to generate a CBR transport stream including a plurality of payload packets and null packets. Stream generator 102 may include one or more encoders that implement one or more conventional encoding algorithms suitable for encoding payload data. For example, the encoders may implement one or more of VVC, H.265/HEVC, H.264/AVC, MPEG-2 encoding, or the like.

In the depicted embodiment, stream generator 102 generates packets in accordance with an MPEG transport stream standard (e.g., ISO/IEC standard 13818-1 or ITU-T Rec. H.222.0). Accordingly, stream generator 102 generates packets having header data in a format 500 depicted in FIG. 5. Stream generator 102 generates a plurality of payload packets which have this header data followed by encoded payload data. Stream generator 102 generates a plurality of null packets as padding to provide a constant bitrate. In the depicted embodiment, each packet is generated to be 188 bytes in length.

Payload data may be encoded from content data received from a content source (not shown), which may be a conventional source of audio and/or video content such as, for example, a television station or an Internet live stream. For example, stream generator 102 may receive linear content by way of a satellite signal, a radio frequency (RF) antenna signal, or a dedicated portion of network 50. Content data may be received in various formats and bitrates.

Figure 5:
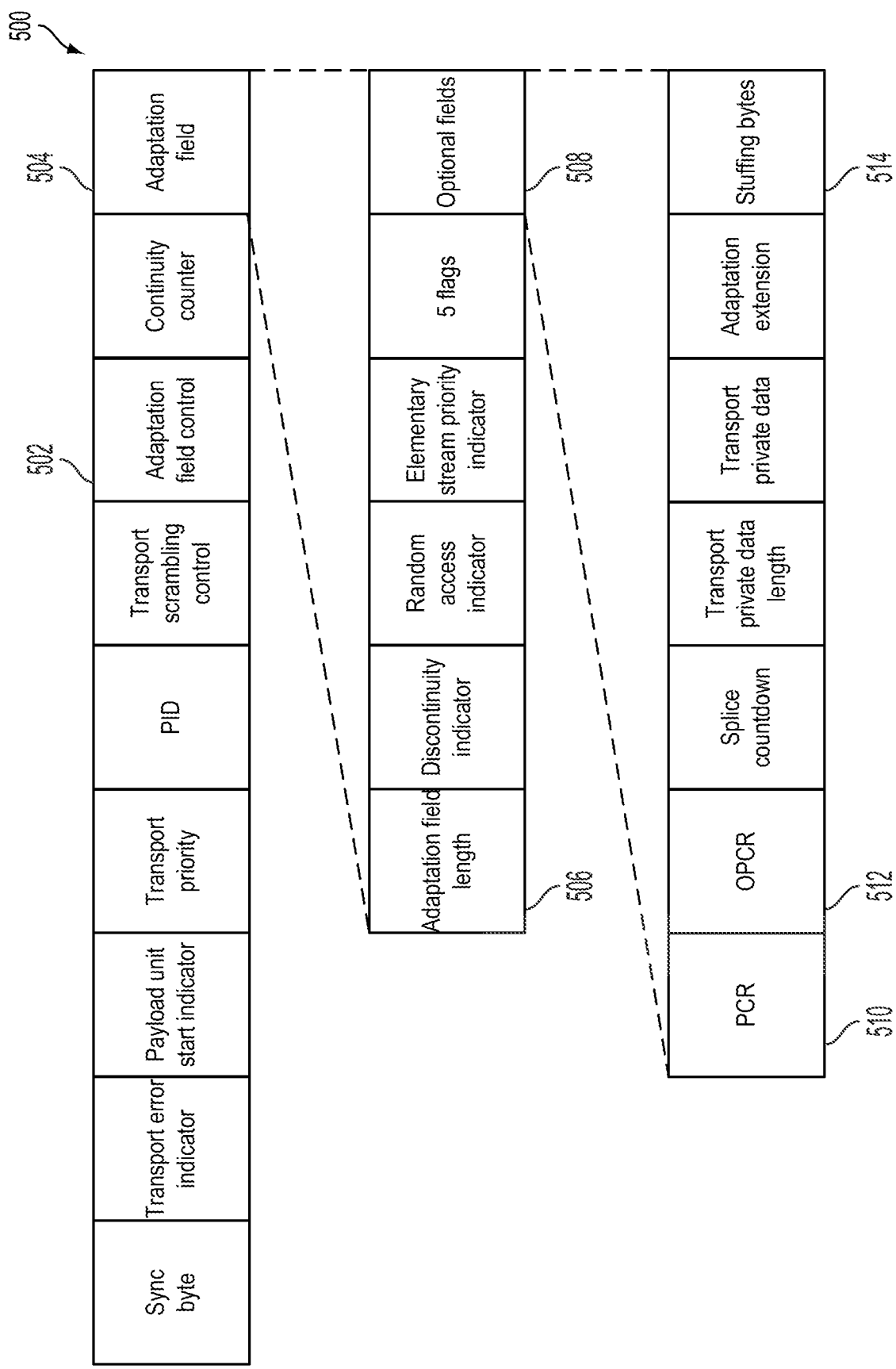
FIG. 5 is a schematic diagram of a header format of a payload packet, in accordance with an embodiment.

Packet processor 104 modifies packets generated by stream generator 102 to facilitate subsequent reconstruction. Referring now to FIG. 5, packet processor 104 modifies a payload packet by inserting timing data into adaptation field 504 of the packet's header. In particular, packet processor 104 inserts timing data into a stuffing area of the header, e.g., stuffing bytes 514 of optional fields 508 of adaptation field 504. This timing data includes a sample of a clock source 106, where the sample indicates the packet's timing within the transport stream.

In the depicted embodiment, packet processor 104 modifies payload packets only. In other embodiments, packet processor 104 may modify other types of packets.

In the depicted embodiment, clock source 106 is a system clock. In some examples, this system clock may correspond to a System Time Clock, as conventionally used in decoding devices. In some examples, this system clock may be the same system clock upon which a conventional Program Clock Reference (PCR) may be based for creation of a transport stream. In some embodiments, clock source 106 has accuracy and precision suitable for one or more of the noted conventional uses. For example, in the depicted embodiment, clock source 106 has jitter that is less than $+/-$ one packet duration to facilitate reconstruction in manners disclosed herein. In other embodiments, clock 106 may be another clock source having comparable accuracy and/or precision.

As noted, the timing data included within the packet header is a sample of clock source 106. In the depicted embodiment, this sample is a subset of a sample of the system clock. This subset may correspond to a full sample of the PCR.

Figure 6:
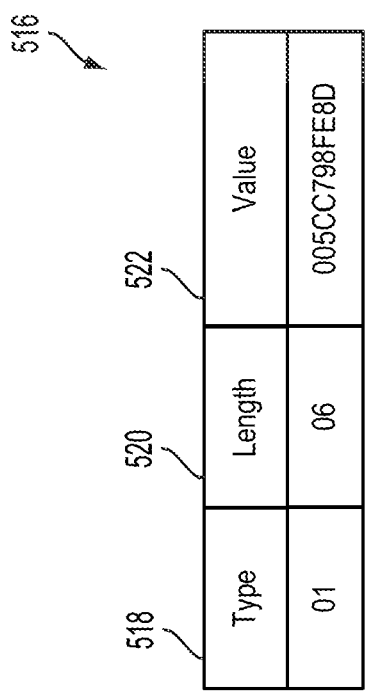
FIG. 6 is a schematic diagram of a data structure for encoding a clock sample, in accordance with an embodiment.

Packet processor 104 constructs a type-length-value (TLV) data structure 516 to encode the sample of clock source 106. An example TLV data structure 516 is depicted in FIG. 6. As depicted, TLV data structure 516 contains a type field 518, a length field 520, and a value field 522. Type 518 field is set to a pre-defined value, which is "01" in this example. The length field is set to indicate a length of 6 bytes, in this example. Accordingly, the value field contains a 6-byte representation of the sample of clock source 106. FIG. 6 depicts an 6-byte hexadecimal presentation of an example sample of clock source 106. Timing data in the form of TLV data structure 516 is inserted into stuffing bytes 514.

Conveniently, in the depicted embodiment, insertion of timing data in stuffing bytes 514 does not interfere with the operation of a legacy device that is not configured to utilize this timing data. This placement of timing data has the effect of making the timing data hidden from such a legacy device. Thus, TS generation system 100 can operate compatibly with such a legacy device and transport streams generated by TS generation system 100 can be processed conventionally at such a legacy device. In other embodiments, timing data may be inserted in another location of the packet that provides similar compatibility with a legacy device.

The timing data inserted into stuffing bytes 514 is separate from and in addition to other timing data that may be contained in a payload packet, such as for example in PCR field 510 and OPCR field 512 of the packet's header. PCR field 510 and OPCR field 512 may be used during broadcast and/or playback (e.g., to synchronize audio and video), and are not present in all payload packets and are not suitable for reconstruction as contemplated herein.

Further, in situations where a transport stream includes data from multiple devices, PCR field 510 and OPCR field 512 may include timing data from such multiple devices, each with a different clock source with different timing characteristics (e.g., accuracy or other characteristics) and/or which may not be in synchronization. Accordingly, reconstruction of a CBR transport stream would be impeded. Such impediment may be avoided in embodiments by providing in the packets timing data sampled from a single clock source (e.g., clock source 106).

Further, the use of such PCR information as defined, for example, in ISO/IEC standard 13818-1 may include assumptions about the linearity of a transport stream. For example, the calculation of input arrival time (e.g., as set forth in equation 2-4 of ISO/IEC standard 13818-1) is determined as the number of bytes in a transport stream between the bytes containing the last bit of two successive PCR (program_clock_reference) fields of the same program divided by the difference between the time values encoded in these same two PCR fields. As will be appreciated, if a transport stream has not been reconstructed to restore missing null packets (e.g., as disclosed herein), then the calculation of arrival time will be negatively impacted.

Packet processor 104 makes certain other modifications to the packet to enhance them to facilitate subsequent reconstruction. In one example, to indicate that the adaption field is being used, packet processor 104 ensures that the first bit of adaptation field control 502 has a value of 1. So, packet processor 104 changes the value of this bit to 1 if it is not already 1. In another example, packet processor 104 modifies the adaptation field length 506 to reflect increased length of adaptation field 504 resulting from insertion of timing data into stuffing bytes 514.

In the depicted embodiment, packet generator 102 generates packets with a payload sized so that combined size of the payload and header is a desired size (e.g., 188 bytes). So, packet generator 102 may generate packets in anticipation of timing data being inserted into the packet header, and to accommodate such timing data.

In the depicted embodiment, packet generator 102 and packet processor 104 are shown as separate components. However, in some embodiments, packet generator 102 and packet processor 104 may be implemented as a single component. For example, packet enhanced with timing data may be directly generated without need for subsequent enhancement.

Transmitter 108 is configured to transmit packets, as enhanced by packet processor 104 to provide a CBR transport stream. For example, the CBR transport stream may be CBR transport stream 200 (FIG. 2).

Figure 4:
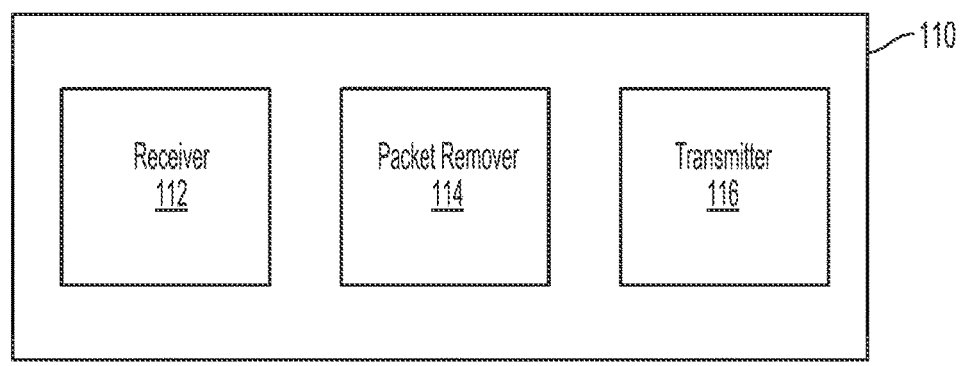
FIG. 4 is a schematic diagram of the TS alteration system of FIG. 1, in accordance with an embodiment.

FIG. 4 is a high-level schematic diagram of TS alteration system 110, in accordance with an embodiment. As depicted, TS alteration system 110 includes receiver 112, packet remover 114, and transmitter 116.

TS alteration system 110 processes a CBR transport stream and generates a VBR transport stream containing the payload packets of the CBR transport stream but with one or more null packets of the CBR transport stream removed. In one example, TS alteration system 110 may remove such null packets to reduce memory requirements for storing the transport stream data. In another example, TS alteration system 110 may remove such null packets to reduce data rate required to transmit the payload. However, removal of such null packets has the effect of changing the CBR stream to a VBR transport stream. The change introduces non-linearity which may impede downstream processing such as, e.g., diagnostic analysis of the transport stream.

Receiver 112 is configured to receive a CBR transport stream (e.g., CBR transport stream 200). Packet remover 114 is configured to process the received CBR transport stream and remove one or more of its null packets. Transmitter 116 is configured to transmit the remaining packets, to provide a VBR transport stream. For example, the VBR transport stream may be VBR transport stream 210 (FIG. 2).

Figure 7:
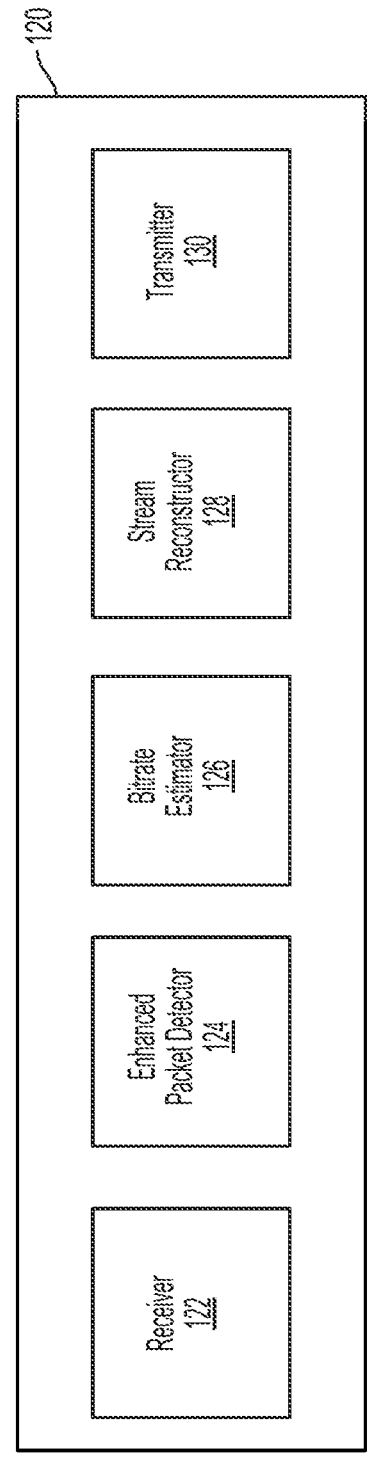
FIG. 7 is a schematic diagram of the TS reconstruction system of FIG. 1, in accordance with an embodiment.

FIG. 7 is a high-level schematic diagram of TS reconstruction system 120, in accordance with an embodiment. TS reconstruction system 120 is configured to reconstruct a CBR transport stream from a VBR transport stream using the timing data included within packets of the VBR transport stream. As depicted, TS reconstruction system 120 includes a receiver 122, an enhanced packet detector 124, a bitrate estimator 126, a stream reconstructor 128, and a transmitter 130.

Receiver 122 is configured to receive a VBR transport stream (e.g., VBR transport stream 202).

Enhanced packet detector 124 processes one or more packets in the received VBR transport stream to determine whether the packets are enhanced to include timing data. For example, enhanced packet detector 124 may process header data of a packet to detect the presence of TLV data structure 516. In the depicted embodiment, enhanced packet detector 124 may process the header data to detect a byte sequence "0106". Enhanced packet detector 124 returns a positive indication if the timing data is detected, and a negative indication if the timing data is not detected.

Bitrate estimator 126 estimates a timing metric corresponding to a bitrate of a CBR transport stream before it was converted to a VBR transport stream. Bitrate estimator 126 estimates this timing metric by extracting clock samples in value field 522 of TLV data structure 516 for each packet in a sequence of packets in the VBR transport stream. Such extracting includes, for example, decoding the value of the clock sample from TLV data structure 516.

In the depicted embodiment, to estimate the timing metric, bitrate estimator 126 process a sequence of 500 packets. In other embodiments, the sequence may include a greater or fewer number of packets.

Bitrate estimator 126 computes a plurality of deltas, each between the clock samples of a pair of adjacent packets to find the minimum delta between two adjacent packets in the original CBR transport stream within the sequence of packets. This minimum delta is taken to be the timing metric, which defines the timing between any two packets in the original CBR transport stream, and thus corresponds to the bitrate of the original CBR transport stream.

Stream reconstructor 128 processes the VBR transport stream received by receiver 122 and generates a reconstructed CBR transport stream (e.g., CBR transport stream 220 of FIG. 2). This reconstructed CBR transport stream represents a reconstruction of the original CBR transport stream (e.g., CBR transport stream 200 of FIG. 2).

Stream reconstructor 128 generates the reconstructed CBR transport stream using the timing metric estimated by bitrate estimator 126 and values of clock samples decoded from value field 522 of TLV data structure 516.

Stream reconstructor 128 generates the reconstructed CBR transport stream upon processing a plurality of packets in the received VBR transport stream. In particular, stream reconstructor 128 extracts the clock samples from pairs of adjacent packets and computes a delta between the two clock samples. If a computed delta is approximately an integer multiple of the timing metric (i.e., the minimum delta) where the integer is greater than 1, this delta indicates that a packet has been removed. For example, given a multiple of integer value n, stream reconstructor 128 determines that n−1 packets have been removed.

Stream reconstructor 128 inserts one or more null packet in between pairs of adjacent packets, as necessary to replace null packets that have been removed. So, for each pair of adjacent packets in the VBR transport stream, stream constructor 128 inserts n−1 null packets, when n is greater than 1.

In some embodiments, based on the extracted clock samples, stream reconstructor 128 detects payload packets that are out of order in the VBR transport stream. For example, stream reconstructor 128 may detect out of order packets if the delta between the two clock samples has a negative value. In such embodiments, stream reconstructor 128 may reorder packets (e.g., to reflect the order in the original CBR transport stream).

In some embodiments, TS reconstruction system 120 does not need to estimate the bitrate, but rather receives data describing the bitrate (e.g., from TS generation system 100). In such embodiments, bitrate estimator 126 may be omitted from TS reconstruction system 120.

Conveniently, in the depicted embodiment, the reconstruction performed by TS reconstruction system 120 avoids certain limitations in conventional methods of addressing missing packets. In one example, limitation of a conventional Continuity Counter (CC) that wraps after reaching its 4-bit count limit may be avoided.

Each of stream generator 102, packet processor 104, clock source 106, transmitter 108, receiver 112, packet remover 114, transmitter 116, receiver 122, enhanced packet detector 124, bitrate estimator 126, stream reconstructor 128, and transmitter 130 may be implemented using a suitable combination of software and hardware components. Software components may be implemented using conventional programming languages such as Java, J #, C, C++, C #, Perd, Visual Basic, Ruby, Scala, etc. Software components may be in the form of one or more executable programs, scripts, routines, statically/dynamically linkable libraries, or the like.

The operation of TS generation system 100 is further described with reference to the flowchart depicted in FIG. 8A. TS generation system 100 performs the example operations depicted at blocks 800 and onward, in accordance with an embodiment.

Prior to block 802, stream generator 102 generates a CBR transport stream. The CBR transport stream includes a plurality of payload packets. The CBR transport stream also includes one or more null packets, as required to provide a constant bitrate given the payload.

At block 802, for each payload packet, packet processor 104 samples clock source 106 to obtain a clock sample.

At block 804, for each payload packet, packet processor 104 inserts an encoding of the clock sample in a stuffing area of a header of the payload packet. The clock sample may be encoded using a TLV construct. The stuffing area may be located in adaptation field 504 of the header, e.g., in stuffing bytes 514.

Blocks 802 and 804 may be repeated for a plurality of payload packets.

At block 806, TS generation system 100 provides a CBR transport stream 200 to a downstream system. CBR transport stream 200 includes the plurality of payload packets with clock samples inserted. For example, transmitter 118 may transmit the CBR transport stream 200 to TS alteration system 110.

Figure 9:
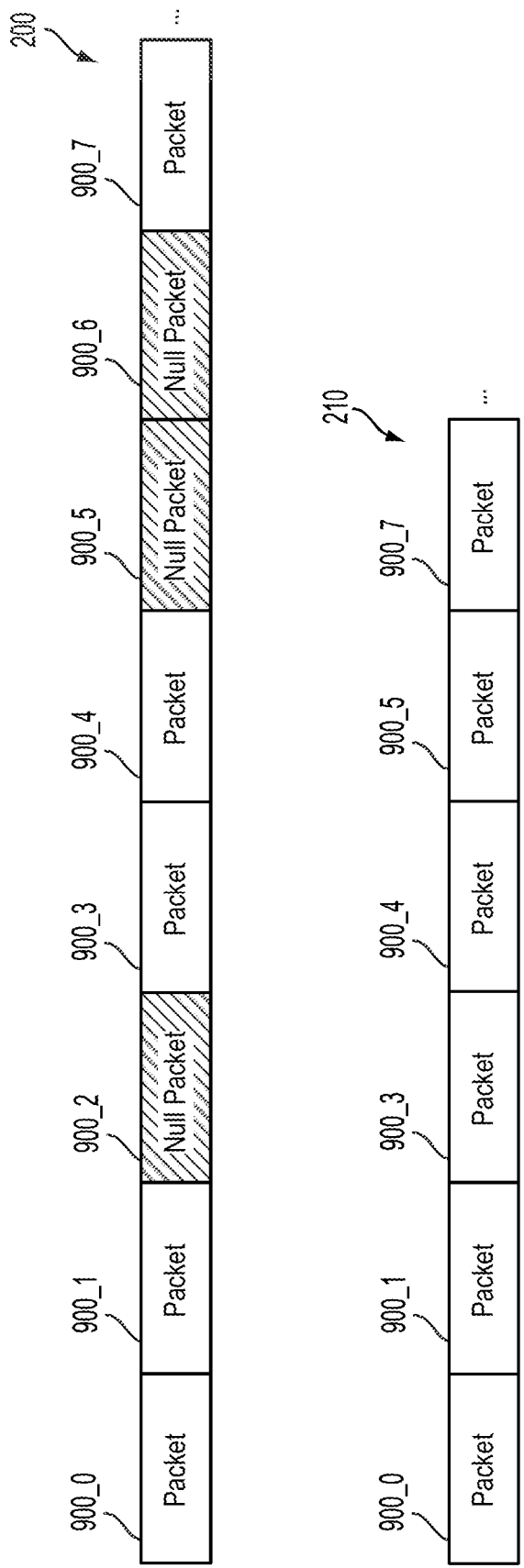
FIG. 9 is a schematic diagram of example transport streams, in accordance with an embodiment.

FIG. 9 depicts an example CBR transport stream 200, in accordance with an embodiment. As depicted, CBR transport stream 200 includes a plurality of payload packets, namely, packets 900_0, 900_1, 900_3, 900_4, and 900_7, and a plurality of null packets, namely packets 900_2, 900_5, and 900_6. Each of these payload packets and null packets may be referred to as a packet 900, and collectively as packets 900.

Figure 8A:
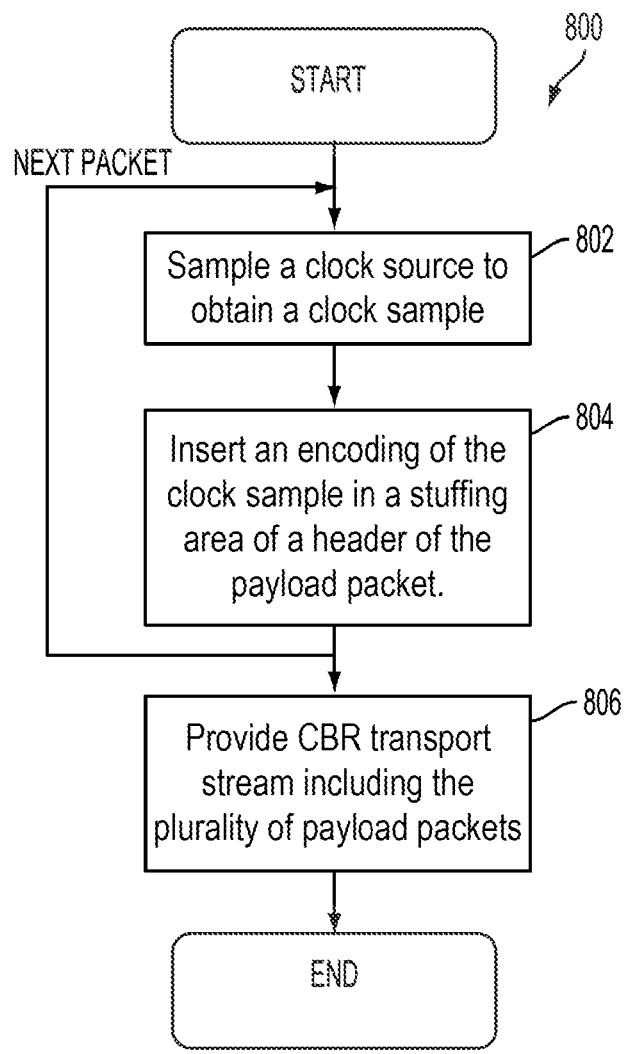
FIG. 8A is a flowchart of example operations performed at the TS generation system of FIG. 1, in accordance with an embodiment.

It should be understood that steps of one or more of the blocks depicted in FIG. 8A may be performed in a different sequence or in an interleaved or iterative manner. Further, variations of the steps, omission or substitution of various steps, or additional steps may be considered.

During example operation, receiver 112 of TS alteration system 110 receives CBR transport stream 200 from TS generation system 100. Packet remover 114 of TS alteration system 110 processes CBR transport stream 200 to remove one or more null packets, and thereby generate VBR transport stream 210. Transmitter 116 of TS alteration system 110 transmits VBR transport stream 210 to a downstream system, e.g., TS reconstruction system 120.

FIG. 9 depicts an example VBR transport stream 210, in accordance with an embodiment. As depicted, VBR transport stream 210 includes packets 900 with null packets removed. Thus, VBR transport stream 210 includes payload packets 900_0, 900_1, 900_3, 900_4, and 900_7.

The operation of TS reconstruction system 120 is further described with reference to the flowchart depicted in FIG. 8B. TS reconstruction system 100 performs the example operations depicted at blocks 850 and onward, in accordance with an embodiment.

At block 852, receiver 122 receives a plurality of packets of VBR transport stream 210, e.g., from TS alteration system 110.

Optionally, at block 852, enhanced packet detector 124 may process one or more of the received packets to determine whether the packets are enhanced to include timing data (e.g., clock samples) for facilitating reconstruction of a CBR transport stream. For example, enhanced packet detector 124 may detect a byte sequence in a packet's header indicating that the clock sample is present. Reconstruction operations may cease if enhanced packet detector 124 determines that the required timing data is not present, e.g., if enhanced packet detector 124 provides a negative indication.

Optionally, at block 852, bitrate estimator 126 may process a subset of the received packets to estimate a timing metric corresponding to a bitrate of the CBR transport stream to be reconstructed. This estimating may include determining a minimum delta between adjacent pairs of packets in the original CBR transport stream in the subset of packets. A subset may include the full set of received packets.

TS reconstruction system 120 processes received packets in pairs. At block 854, stream reconstructor 128 extracts a clock sample from a header of each packet of a pair of adjacent packets in VBR transport stream 210. At block 856, stream reconstructor 128 computes a delta between the clock samples from the adjacent packets. At block 858, stream reconstructor 128 insert one or more null packets between the adjacent packets based on the computed delta and a timing metric corresponding to a bitrate of the CBR transport stream.

Figure 10:
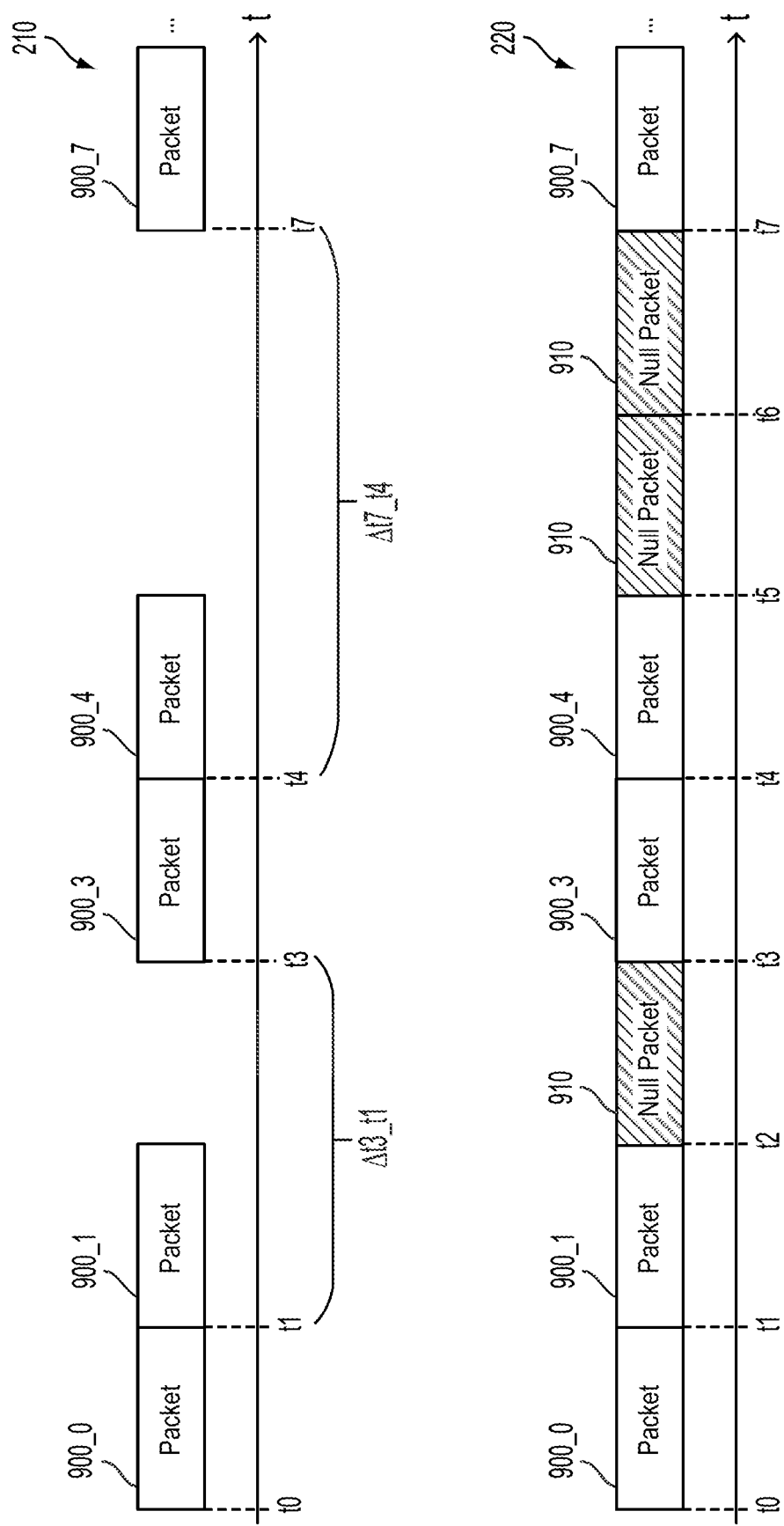
FIG. 10 is a schematic diagram of example reconstruction of a transport stream, in accordance with an embodiment.

Referring to FIG. 10, in one example, at block 856 stream reconstructor 128 computes a delta between clock reference t0 of packet 900_0 and clock reference t1 of packet 900_1. Stream reconstructor 128 then computes a multiple of the delta relative to the timing metric corresponding to a bitrate of the CBR transport stream to be reconstructed. In the case of the delta between t0 and t1, the multiple (n) is approximately 1, and the number of null packets determined to have been removed is 0 (n−1).

In another example, stream reconstructor 128 computes a delta Δt3_t1 between clock reference t3 of packet 900_3 and clock reference t1 of packet 900_1. The multiple of delta Δt3_t1 relative to the timing metric is approximately 2 (n), indicating that 1 (n−1) null packet has been removed.

In another example, stream reconstructor 128 computes a delta Δt7_t4 between clock reference t7 of packet 900_7 and clock reference t4 of packet 900_4. The multiple of delta Δt7_t4 relative to the timing metric is approximately 3 (n), indicating that 2 (n−1) null packets have been removed.

At block 858, stream reconstructor 128 inserts one or more null packets between the adjacent packets based on the computed delta and the timing metric. So, referring to the sample depicted in FIG. 10, stream reconstructor 128 inserts 1 null packet 910 between packet 900_1 and 900_3 and inserts 2 null packets 910 between packets 900_4 and 900_7.

Blocks 854, 856 and 858 may be repeated for a plurality of adjacent pairs of packets. In this way, stream reconstructor 128 generates a CBR transport stream 220 that is a reconstruction of CBR transport stream 200.

Figure 8B:
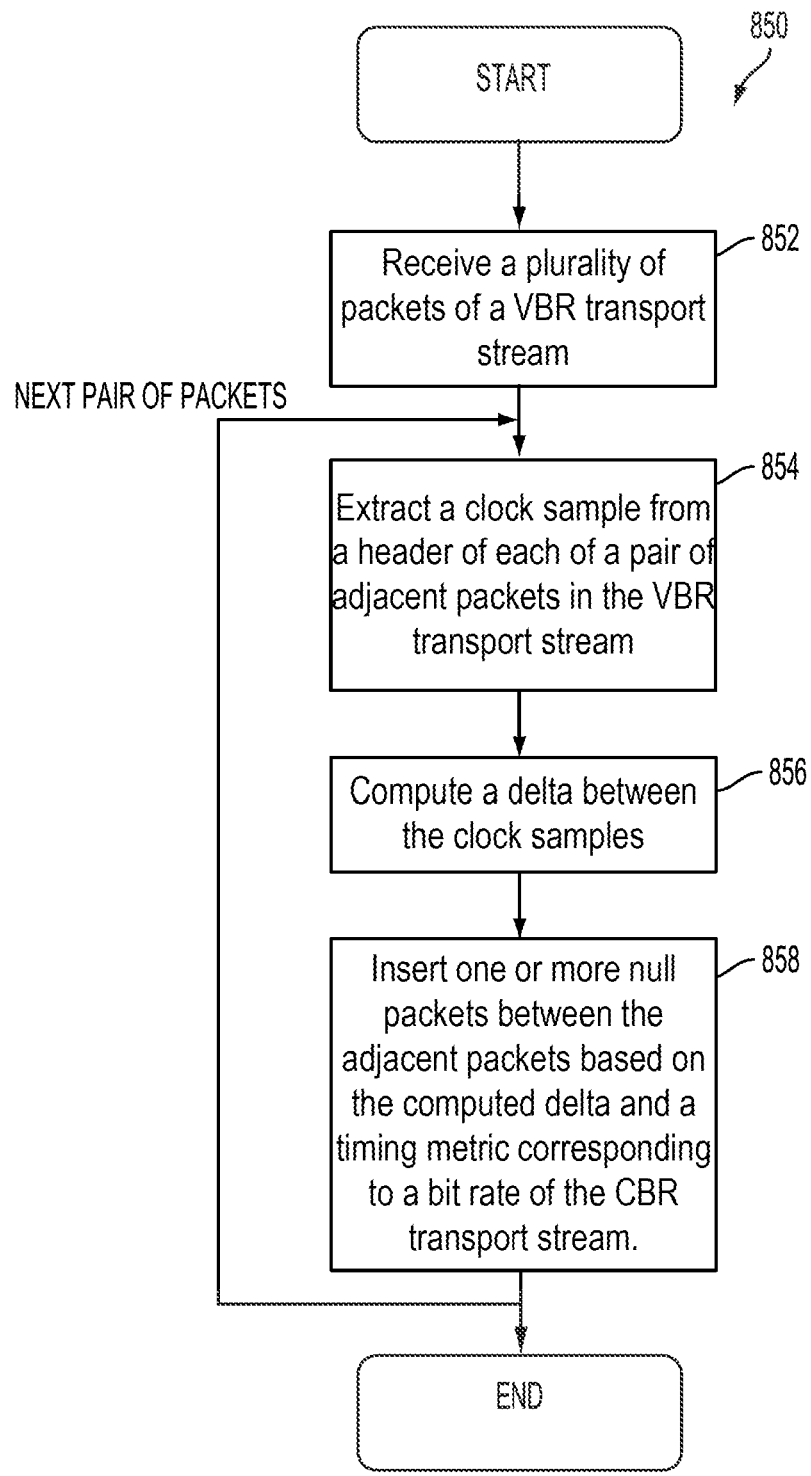
FIG. 8B is a flowchart of example operations performed at the TS reconstruction system of FIG. 1, in accordance with an embodiment.

It should be understood that steps of one or more of the blocks depicted in FIG. 8B may be performed in a different sequence or in an interleaved or iterative manner. Further, variations of the steps, omission or substitution of various steps, or additional steps may be considered.

Embodiments have been described above in which a CBR transport stream is generated with packets enhanced with timing data to facilitate subsequent reconstruction, wherein the timing data includes a clock sample. In other embodiments, the timing data may include a counter instead of a clock sample. In an embodiment, the counter may span all available bytes of the stuffing area in the packet header. A CBR transport stream may be reconstructed by recovering a counter value from a packet header. Comparison of this counter value with the counter value of the prior packet in the stream would provide an indication of any out-of-order or missing packets. In one example, if counter values are not consecutive in adjacent packets, this is an indication that packets are missing in between these packets with the delta (n) in counter values indicating how many packets (n−1) are missing. In another example, if counter values are not increasing in adjacent packets, this is an indication that packets have arrived out of order. A transport stream can be re-ordered on the basis of such counters (e.g., to place such counters in consecutive order). A CBR transport stream can be reconstructed by replacing any null packets indicated as missing by counter values extracted from a VBR transport stream.

Figure 11:
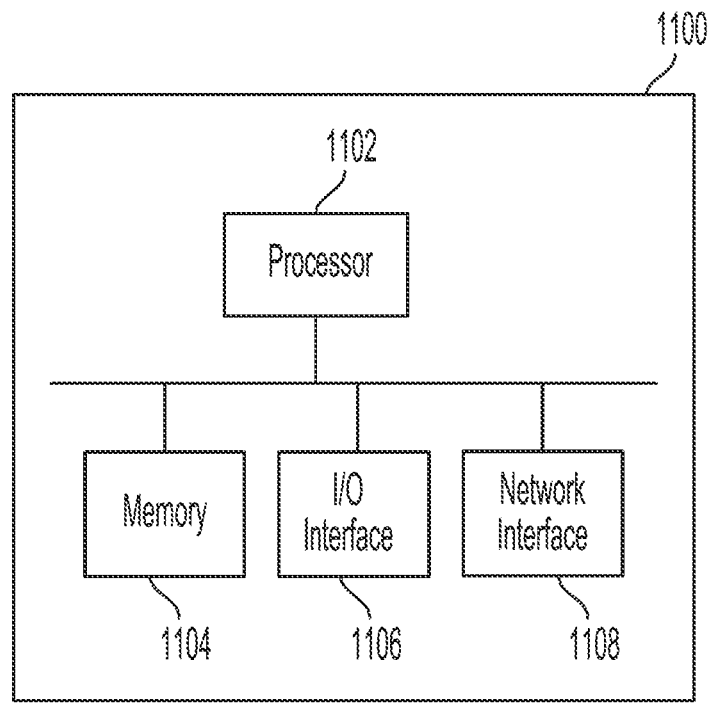
FIG. 11 is a schematic diagram of a computing device, in accordance with an embodiment.

FIG. 11 is a schematic diagram of computing device 1100 which may be used to implement one or more of TS generation system 100, TS alteration system 110, and TS reconstruction system 120, in accordance with an embodiment.

As depicted, computing device 1100 includes at least one processor 1102, memory 1104, at least one I/O interface 1106, and at least one network interface 1108.

Each processor 1102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 1100 is shown but any of systems 100, 110 and 120 may include multiple computing devices 1100. The computing devices 1100 may be the same or different types of devices. The computing devices 1100 may be connected in various ways including directly coupled, indirectly coupled via a network, and distributed over a wide geographic area and connected via a network (which may be referred to as "cloud computing").

For example, a computing device 1100 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which may be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for reconstructing a constant bitrate (CBR) transport stream, the method including:
receiving a plurality of packets of a variable bitrate (VBR) transport stream;
for a pair of adjacent packets in the VBR transport stream:
extracting a clock sample from a header of each of the pair adjacent packets, wherein the clock sample is extracted from a stuffing area of the header, wherein the clock sample is distinct from timing data in a program clock reference (PCR) field of the header, and wherein the stuffing area of the header is distinct from the PCR field of the header;
computing a delta between the clock samples; and
inserting one or more null packets between the adjacent packets based on the computed delta and a timing metric corresponding to a bitrate of the CBR transport stream.

2. The computer-implemented method of claim 1, wherein a count of the inserted one or more null packets is based on computing a multiple of the delta relative to the timing metric.

3. The computer-implemented method of claim 1, wherein the stuffing area is located in an adaptation field of the header.

4. The computer-implemented method of claim 1, wherein said extracting the clock sample includes decoding the clock sample from a type-length-value construct.

5. The computer-implemented method of claim 1, further comprising detecting a byte sequence in the header indicating that the clock sample is present.

6. The computer-implemented method of claim 1, further comprising:
estimating the timing metric from a subset of the plurality of packets.

7. The computer-implemented method of claim 6, wherein said estimating includes determining a minimum delta between adjacent pairs of packets in the subset of the plurality of packets.

8. The computer-implemented method of claim 1, further comprising reordering packets based on the clock samples.

9. A computer-implemented system for reconstructing a constant bitrate (CBR) transport stream, the system comprising:
at least one processor;
memory in communication with the at least one processor;
software code stored in the memory, which when executed at the at least one processor causes the system to:
for a pair of adjacent packets in a VBR transport stream:
extract a clock sample from a header of each of the adjacent packets, wherein the clock sample is extracted from a stuffing area of the header, wherein the clock sample is distinct from timing data in a program clock reference (PCR) field of the header, and wherein the stuffing area of the header is distinct from the PCR field of the header;
compute a delta between the clock samples; and
insert one or more null packets between the adjacent packets based on the computed delta and a timing metric corresponding to a bitrate of the CBR transport stream.

10. The computer-implemented system of claim 9, wherein a count of the inserted one or more null packets is based on computing a multiple of the delta relative to the timing metric.

11. The computer-implemented system of claim 9, wherein the stuffing area is located in an adaptation field of the header.

12. A computer-implemented method for generating a constant bitrate (CBR) transport stream, the method comprising:
for each of a plurality of payload packets:
sampling a clock source to obtain a clock sample; and
inserting an encoding of the clock sample in a stuffing area of a header of the payload packet, wherein the encoding of the clock sample is distinct from timing data in a program clock reference (PCR) field of the header, and wherein the stuffing area of the header is distinct from the PCR field of the header; and
providing the CBR transport stream including the plurality of payload packets.

13. The computer-implemented method of claim 12, wherein the clock sample is encoded using a type-length-value construct.

14. The computer-implemented method of claim 12, wherein the clock source is a system clock.

15. The computer-implemented method of claim 14, wherein the clock sample is a subset of a sample of the system clock.

16. The computer-implemented method of claim 12, wherein the stuffing area is located in an adaptation field of the header.

17. The computer-implemented method of claim 16, further comprising:
setting a bit of an adaption field control field of the header.

18. A constant bitrate (CBR) transport stream source comprising:
a clock; and
a packet processor that, for each of a plurality of payload packets, samples a clock source to obtain a clock sample from the clock and inserts the clock sample into a stuffing area of a header of the payload packet, wherein the clock sample is distinct from timing data in a program clock reference (PCR) field of the header, and wherein the stuffing area of the header is distinct from the PCR field of the header; and
a transmitter that transmits a CBR transport stream including the payload packets.

19. The constant bitrate (CBR) transport stream source of claim 18, wherein the stuffing area is located in an adaptation field of the header.

* * * * *

UNITED STATES PATENT AND TRADEMARK OFFICE
CERTIFICATE OF CORRECTION

| | | |
|---|---|---|
| PATENT NO. | : 12,184,715 B2 | Page 1 of 1 |
| APPLICATION NO. | : 17/871055 | |
| DATED | : December 31, 2024 | |
| INVENTOR(S) | : Rhodri Harris et al. | |

It is certified that error appears in the above-identified patent and that said Letters Patent is hereby corrected as shown below:

In the Specification

At Column 5, Line number 16, delete "less than +/-$_2$" and replace with --less than +/- ½--.
At Column 8, Line number 26, delete "Perd" and replace with --Perl--.

Signed and Sealed this
Second Day of December, 2025

John A. Squires
*Director of the United States Patent and Trademark Office*